United States Patent
Hsu-Hung et al.

(10) Patent No.: US 9,298,551 B2
(45) Date of Patent: Mar. 29, 2016

(54) EFFICIENT INCREMENTAL UPDATES FOR SHINGLED MAGNETIC RECORDING (SMR) DRIVES IN A RAID CONFIGURATION

(71) Applicant: Dell Products L.P., Round Rock, TX (US)

(72) Inventors: Damon Hsu-Hung, Sudbury, MA (US); G. Paul Koning, New Boston, NH (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 14/079,346

(22) Filed: Nov. 13, 2013

(65) Prior Publication Data
US 2015/0135005 A1    May 14, 2015

(51) Int. Cl.
*G06F 11/00* (2006.01)
*G06F 11/10* (2006.01)
*G11B 20/12* (2006.01)
*G11B 20/18* (2006.01)

(52) U.S. Cl.
CPC ........ *G06F 11/1096* (2013.01); *G11B 20/1217* (2013.01); *G11B 20/1833* (2013.01); *G06F 2201/82* (2013.01)

(58) Field of Classification Search
CPC ............ G06F 11/1096; G11B 20/1217; G11B 20/1833
See application file for complete search history.

(56) References Cited

U.S. PATENT DOCUMENTS

| | | | |
|---|---|---|---|
| 8,699,175 B1* | 4/2014 | Olds et al. | 360/78.14 |
| 2014/0019680 A1* | 1/2014 | Jin et al. | 711/112 |
| 2014/0036383 A1* | 2/2014 | Cideciyan et al. | 360/55 |
| 2014/0143488 A1* | 5/2014 | Snaman et al. | 711/114 |
| 2015/0135005 A1* | 5/2015 | Hsu-Hung et al. | 714/6.24 |

OTHER PUBLICATIONS

Gibson, Garth, "Principles of Operation for Shingled Disk Devices," PDL Packet, Newsletter on PDL Activities and Events, Spring 2011, http://www.pdlcmu.edu/, pp. 17-19.

* cited by examiner

*Primary Examiner* — Philip Guyton
(74) *Attorney, Agent, or Firm* — Hamilton, Brook, Smith & Reynolds, P.C.

(57) ABSTRACT

The invention pertains to a method and apparatus for writing data to an array of Shingled Magnetic Recording (SMR) devices. In an embodiment of the invention a parity band configured to allow random access writes is provided. Next, data is appended sequentially to a stripe on an array of SMR devices. Then the parity band is updated to contain parity data consistent with the data appended to the stripe. In another embodiment of the invention, a shingled parity band is provided. Data is then appended sequentially to a stripe on an array of SMR devices without the user being required to write an entire stripe of data. The provided parity band is then updated to contain parity data consistent with the data that was appended to the stripe. In such an embodiment it is not always necessary to delete all of the parity data in the parity band when updating the parity band.

21 Claims, 13 Drawing Sheets

EFFICIENT INCREMENTAL UPDATES FOR SHINGLED MAGNETIC RECORDING (SMR) DRIVES IN A RAID CONFIGURATION

BACKGROUND OF THE INVENTION

A disk drive is a device implementing disk storage in which data is digitally recorded by various electronic, magnetic, optical, or mechanical methods on disks (also referred to as the media). Disk storage is used in both computer storage and consumer electronic storage (e.g., audio CDs and video disks, standard DVD and Blu-Ray). To that end, disk drives, may implement such disk storage, with fixed or removable media. With removable media, the device is usually distinguished from the media as in a compact disk drive and a compact disk. Notable types of disk drives are the hard disk drive (HDD) containing a nonremovable disk, the floppy disk drive (FDD) and its removable floppy disk, and various optical disk drives and associated optical disk media.

The disk drive stores data onto cylinders, heads, and sectors of a disk. A sector is a segment of a track, and a track is a circle of recorded data on a single recording surface or platter (an individual recording disk). The sector unit is the smallest size of data to be stored in a hard disk drive and each data file will have many sector units assigned to it. Digital disk drives are block storage devices. Each disk is divided into logical blocks which are a collection of sectors. Blocks are addressed using their logical block addresses (LBA). Reading from or writing to a disk happens at the granularity of blocks.

The disk drive interface is the mechanism/protocol of communication between the rest of the system and the disk drive itself. Storage devices intended for desktop and mobile computers typically use ATA (Advanced Technology Attachment), PATA (Parallel ATA), and SATA (serial ATA) interfaces. Enterprise systems and other storage devices typically use SCSI (Small Computer System Interface), SAS (serial attached SCSI), and FC (Fiber Channel) interfaces in addition to some use of SATA.

There is an ever increasing amount of electronic data being created. Likewise, computer users are requiring an ever increasing amount of disk drive storage space. Home computer users' increased storage of multimedia data, especially video and photographic data has served to increase the amount of storage space needed. Likewise, industry also requires increased storage space. As more and more business is being conducted electronically, there has been an ever increasing demand and necessity for the storage of this vast amount of business data. Furthermore, there has been a demand to digitize the storage of once paper files in an attempt to decrease the overhead cost of this paper storage.

Currently, the majority of electronic data is stored on magnetic hard disk drive devices. However, the increased need of storage capacity has made current magnetic disk storage devices inadequate and a solution to this problem is necessary.

"Shingled Magnetic Recording," (SMR) provides a method of increasing the storage density of current magnetic hard disk drives. SMR devices have shingled tracks, meaning the tracks on the platter of the device overlap some amount. This provides a more efficient storage methodology. However, utilizing SMR devices requires a fundamentally new and different access model that allows random reads and only sequential writes.

A SMR device is divided into a configurable number of regions, called bands. The bands comprise tracks like standard magnetic recording devices and likewise these tracks comprise sectors. Unlike standard magnetic recording devices, the tracks on a SMR device are overlapped, also known as, shingled, thus increasing the storage density of the device. The bands of a SMR device may be configurable. This allows certain bands to be configured for "sequential access" while other bands on the same platter can be "random access" like traditional magnetic storage devices. A "sequential access band" supports random reads but may only be written to sequentially. More precisely, data must be written starting at the beginning of the band, and may be added only in sequential order. Any data already written in a band cannot be changed, except by erasing the entire band and starting over at the beginning (for writing). A "random access band" supports random writes as well as reads, similar to existing hard disk drives, but does not possess the improved density of SMR sequential access bands.

SMR disk drives are being promoted as a means to increase the storage density of magnetic disk drives using current-generation technology. However, existing systems have no ability to cope with the different access model that SMR technology requires. Manufacturers plan to implement expensive and inefficient emulation strategies to make a SMR device behave like a traditional random-access device.

More information can be found here:
www.pdl.cmu.edu/ftp/News/newsletter11.pdf

However, manufacturers have been amenable to providing a separate interface that exposes the native layout of the SMR device, along with its attendant limitations. Writing data to a single SMR device poses a difficult problem. However, even a method developed to write data to a single SMR device cannot simply be transferred and used to write data to an array of SMR devices. Thus, a method is needed to write data to an array of SMR devices.

SUMMARY OF THE INVENTION

Embodiments of the present invention provide a method and apparatus for writing data to an array of SMR devices.

The present invention provides advancements and improvements over the foregoing. In particular, a method is disclosed whereby data can be written to an array of SMR devices without placing onerous writing restrictions upon users.

An embodiment of the present invention begins by providing a parity band which is formatted to allow random access writes. Then data is appended sequentially to a stripe on an array of SMR devices. The parity band is updated to hold parity data consistent with the data appended to the stripe.

Another embodiment of the present invention begins by providing a shingled parity band that is formatted to allow for limited re-writing. Data is then appended sequentially to a stripe on the array of SMR devices. However, unlike other inefficient methods the minimum amount of data that can be appended is less than the size of the stripe. After appending the data, the parity band is updated to contain parity data consistent with the data that was appended to the stripe. Again this efficient data storage method does not require all of the existing parity data to always be deleted for the parity band to hold parity data consistent with the data in the stripe. In an embodiment of the present invention that utilizes a parity band that is formatted to allow for limited re-writing, updating the parity band comprises deleting existing parity data from a point in the band to an append location.

Embodiments of the invention provide a method and corresponding apparatus for configuring an array of SMR devices to provide redundant array of independent disk (RAID) services, such as RAID50, RAID5 and RAID6. Further, in an embodiment of the invention the array of SMR devices is in a RAID configuration. According to an embodiment of the present invention, data may be appended to an append unit sequentially. An append unit may comprise a grouping of bands. In a further embodiment of the invention, the append unit comprises respective uncorresponding bands. In yet another embodiment of the invention a stripe on the array of SMR devices is composed of stripe units, and in turn these stripe units comprise a set of sectors. Yet further still, in an embodiment of the present invention data may be appended to both the set of sectors and set of stripe units sequentially. In another embodiment, data is appended to the array of SMR devices in units as small as an underlying device in the array will allow. In another example embodiment of the present invention, each SMR device in the array of SMR devices is formatted with a same band configuration.

An embodiment of an apparatus according to the principles of the present invention is directed to an Information Handling System (IHS) configured to write data to an array of SMR devices. In such an embodiment, the IHS comprises a parity band providing module configured to provide a parity band configured to allow random access writes. Further, the IHS may comprise a data appending module configured to append data sequentially to a stripe on an array of SMR devices and a parity band update module configured to update the parity band to hold parity data consistent with the data appended to the stripe. Embodiments of the IHS may be configured to perform any of the embodiments described herein.

Embodiments of the present invention address the shortcoming of the prior art.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 8A is a diagram depicting data written to SMR drives in a RAID5 configuration where the parity bands are physically rotated.

FIG. 8B is a diagram depicting data written to SMR drives in a RAID5 configuration where the parity bands are logically rotated.

FIG. 8C is a diagram depicting data written to SMR drives in a RAID5 where a fixed quantity of bands are sacrificed in order to avoid short backward seeks while writing data.

FIG. 9A is a diagram depicting data written in a RAID5 configuration of SMR drives wherein (n−1), n being the width of the RAID set, bands per drive are sacrificed in order to avoid short backward seeks while writing data.

FIG. 9B is a diagram depicting a possible data storage scheme for the sacrificed space depicted in FIG. 9A.

DETAILED DESCRIPTION OF THE INVENTION

A description of example embodiments of the invention follows.

The teachings of all patents, published applications, and references cited herein are incorporated by reference in their entirety.

Figure 1:
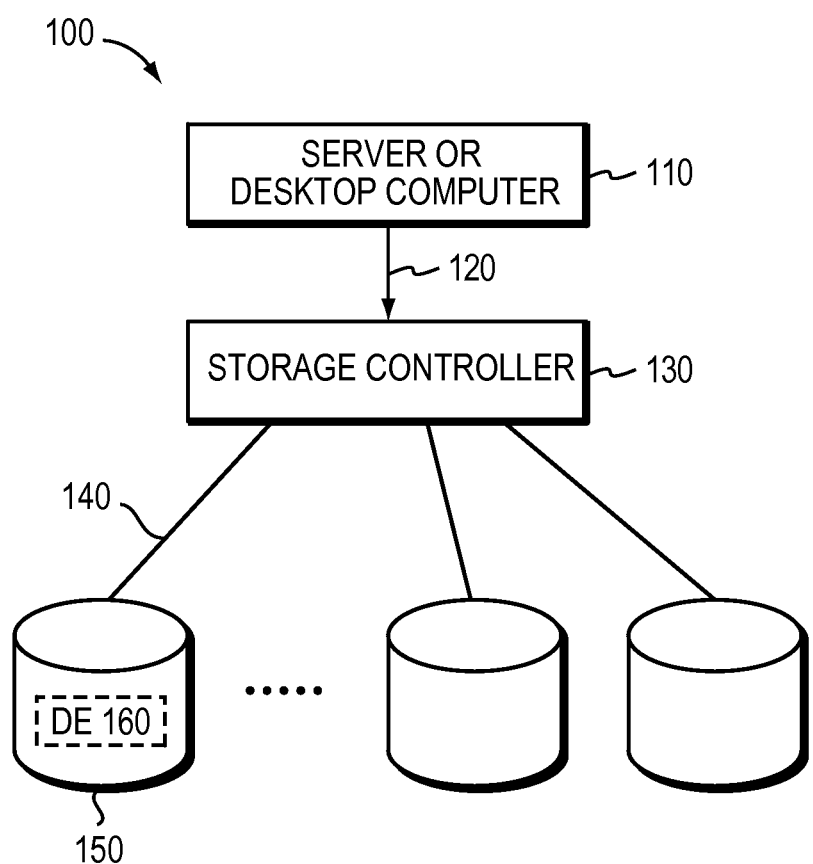
FIG. 1 is a schematic view of a computer system with disk storage in which the present invention may be implemented.

FIG. 1 shows a computer system 100, which may be a server system or a user workstation such as a desktop or laptop computer. The host or base computer 110 (the central processor of the computer system excluding its attached storage), connects to a storage controller 130. The storage controller 130 may be a simple disk controller, or it may incorporate more advanced storage mechanisms such as Redundant Array of Independent Disks (RAID). The computer 110 is connected to the controller 130 via an interconnect 120. The interconnect may be a system bus such as the Peripheral Component Interface (PCI) bus, or it may be a Storage Area Network (SAN) based on Fibre Channel or other SAN technology. The storage controller 130 in turn connects to one or more disk drives 150, via disk channels 140. The disk channels 140 may be provided by any suitable disk drive interface such as Advanced Technology Attachment (ATA), Small Computer System Interface (SCSI) or other disk interfaces.

Disk drives 150 have respective drive electronics 160. The process described below (e.g. method 600 of FIG. 6), may be implemented in computer 110, storage controller 120 and/or within drive electronics 150.

Figure 2:
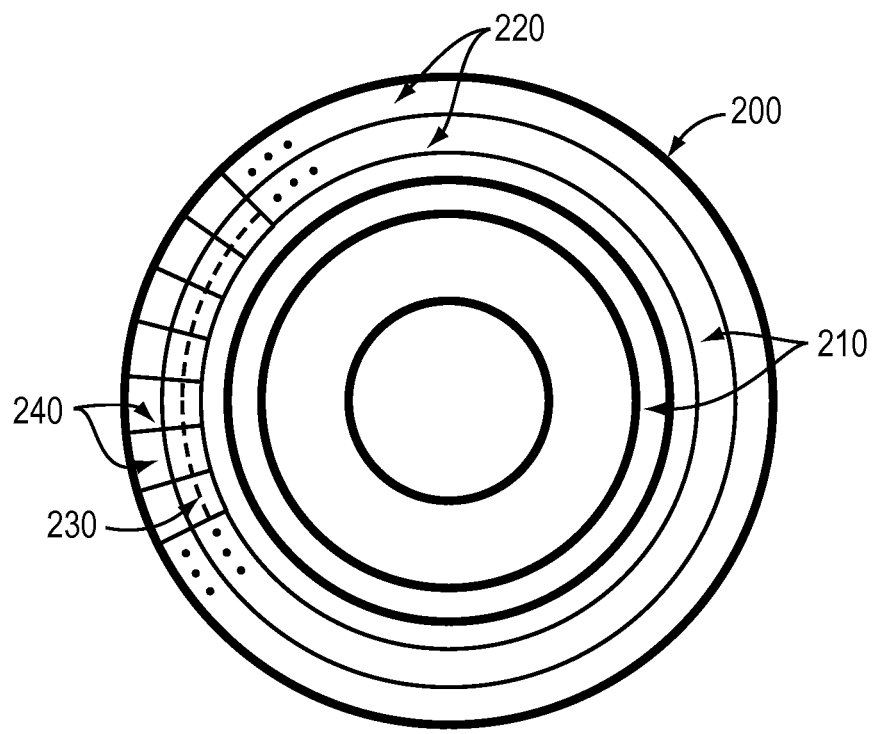
FIG. 2 is a depiction of a platter of a SMR device to which embodiments of the invention may write data.

FIG. 2 illustrates a single platter 200 of a storage device 150, to which the present invention may write data. The platter 200 is divided into bands 210. The bands 210 represent independent regions of data storage space. These bands 210 can be representative of the sequential access bands of a SMR device. A single device 150 or any array of such devices 150 may have bands of many different sizes. The bands 210 are composed of a grouping of shingled tracks 220. The shingled tracks 220 overlap some amount 230. This overlap 230 allows for the increased storage density of the platter 200 and the underlying device 150. The shingled tracks 220 are composed of multiple pools of free space 240 to which data can be written.

Figure 3:
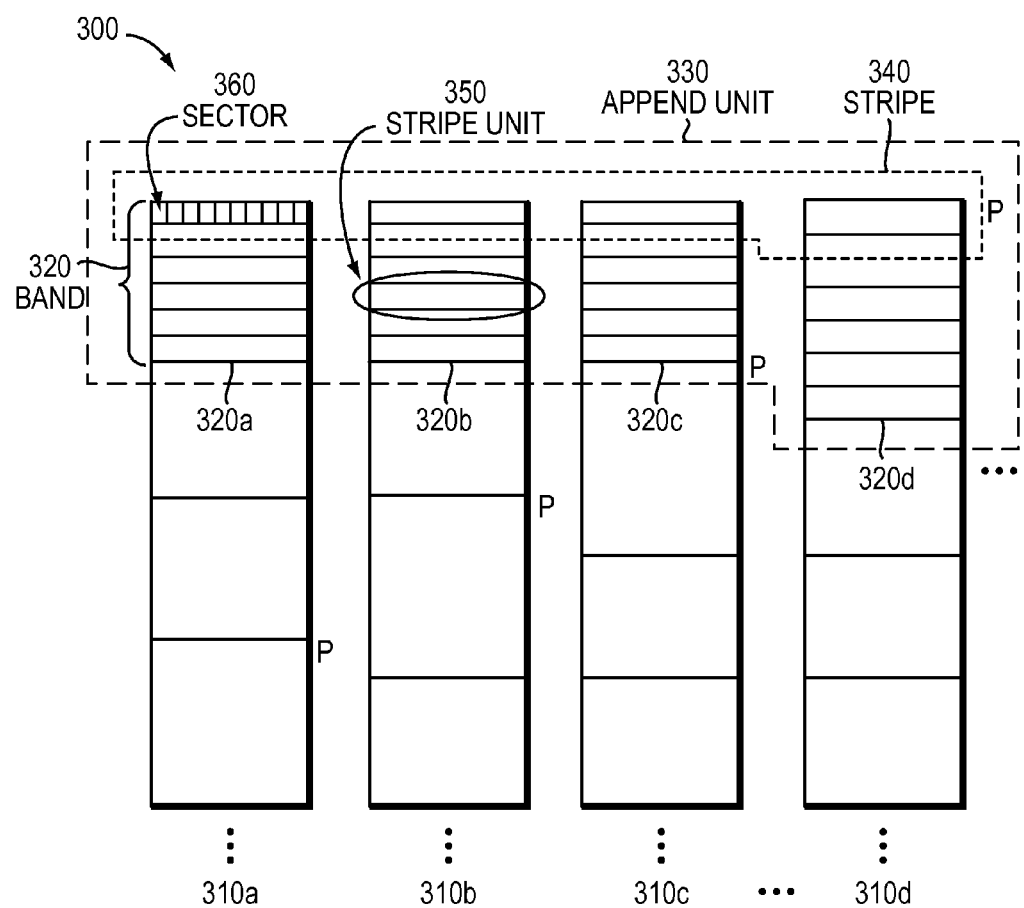
FIG. 3 is a simplified diagram of an array of SMR drives to which an embodiment of the present invention may write data.

FIG. 3 illustrates an array of SMR drives in a RAID configuration 300 to which an embodiment of the invention may write data. The present invention may write data to an array of SMR drives in numerous different configurations, as described herein. The array 300 has drives 310a-310d. Each drive 310a-310d contains bands such as 320. A set of bands 320a-320d make up an append unit 330. The bands that comprise an append unit may be corresponding bands such as bands 320a-d. In an alternative embodiment the bands comprising an append unit may be uncorresponding bands. In FIG. 3 only append unit 330 has been delineated; however the array of SMR devices 300 comprises four append units. In practice an array of SMR devices may contain thousands of append units. Append unit 330 comprises sequential access bands 320a-320c and parity band 320d. Within append unit 330 is a set of stripes, such as stripe 340. Again, while only stripe 340 has been highlighted, the append unit 330 contains six stripes. Stripe 340 is comprised of stripe units. A grouping of individual stripe units, such as stripe unit 350, make up a stripe. A single stripe unit may contain a set of sectors 360.

Putting together SMR drives 150, with underlying devices with platters 200 in a RAID configuration 300 is not straightforward. A single SMR device 150 with platter 200 has individual bands 210 that can only be written to sequentially. However, an array of such SMR devices 150 with platters 200 does not naturally support even that limited sequential model.

Figure 4A:
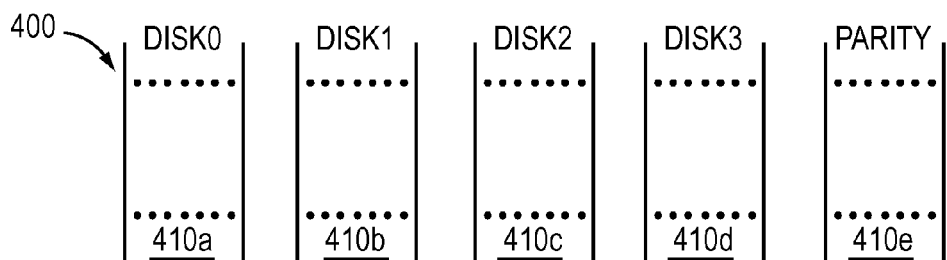
FIG. 4A is a block diagram of one sequential-access band of SMR drives in a RAID5 array.

Consider a hypothetical SMR drive with 5 bands of 1 GB each. In the figures, let "S-band" denote a sequential-access band, and "R-band" be a random-access band. Consider a RAID5 array of these hypothetical drives. Illustrated in FIG. 4A is one sequential-access band 400 of a RAID5 array of SMR disks 410a-410e. This sequential access band 400 exclusively supports append-only data storage. This is a limitation of the underlying SMR drives 410a-410e.

Figure 4B:
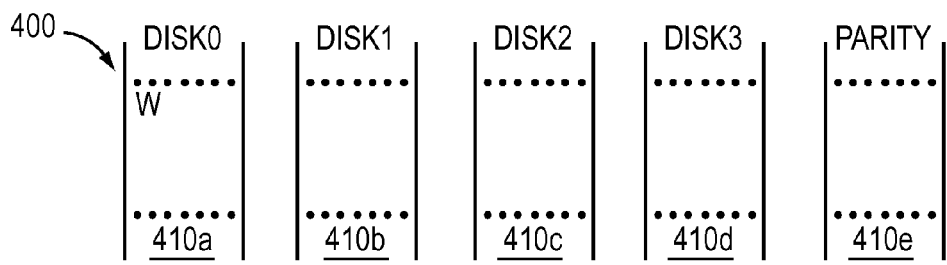
FIG. 4B is a block diagram of one sequential-access band of SMR drives in a RAID5 array with a single unit of data written to the band.
Figure 4C:
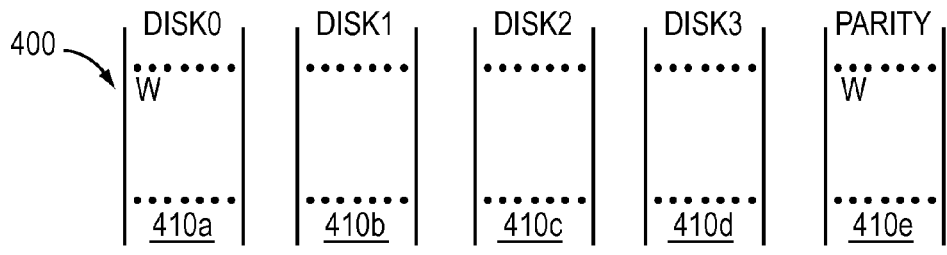
FIG. 4C is a block diagram of one sequential-access band of SMR drives in a RAID5 array with a unit of data and the corresponding parity data written to the band.
Figure 4D:
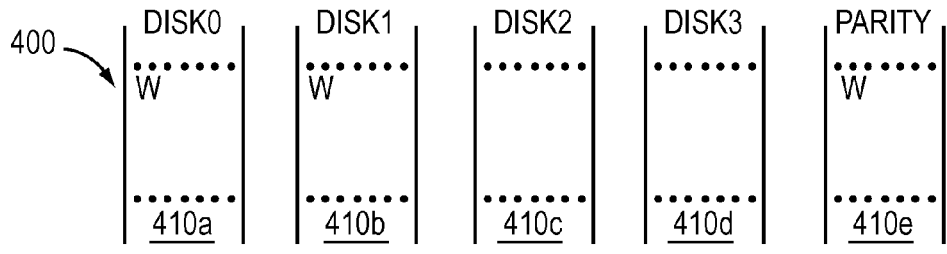
FIG. 4D is a block diagram as in FIG. 4C where a user has appended another unit of data.

Now, even if we have a file system or datastore that supports append-only operation (as in FIG. 4A), that still leaves a significant constraint upon the access model. Because the underlying drives 410a-410e are SMR devices the parity data must also be written in an append-only manner. Suppose the user writes only a single unit of data to drive 410a, as illustrated in FIG. 4B. Normally, RAID would then perform the relevant operations needed to update the parity as shown in FIG. 4C. But suppose the user then appends another unit of data, as illustrated in FIG. 4D. This appended data is written to the next drive in the RAID stripe 410b. Now that additional data has been written to the stripe, RAID would normally perform the operations needed to update the parity data. However, because the parity data is being written to a sequential access band the associated parity has already been written and cannot be changed. We are stuck.

Figure 5A:
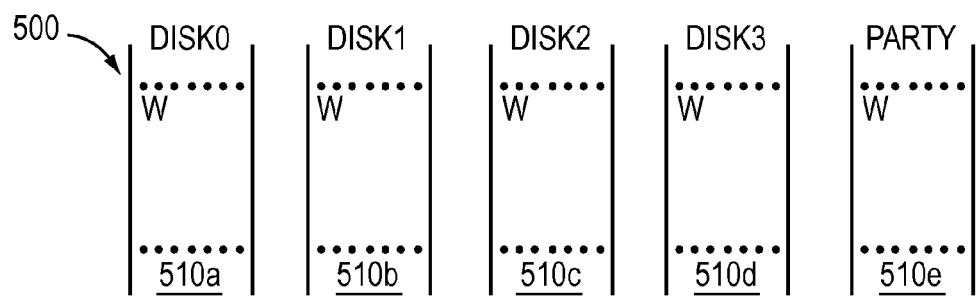
FIG. 5A is a block diagram of one sequential-access band of SMR drives in a RAID5 array where the user is restricted to writing N units of data at a time, where N is the number of data units in a RAID stripe.
Figure 5B:
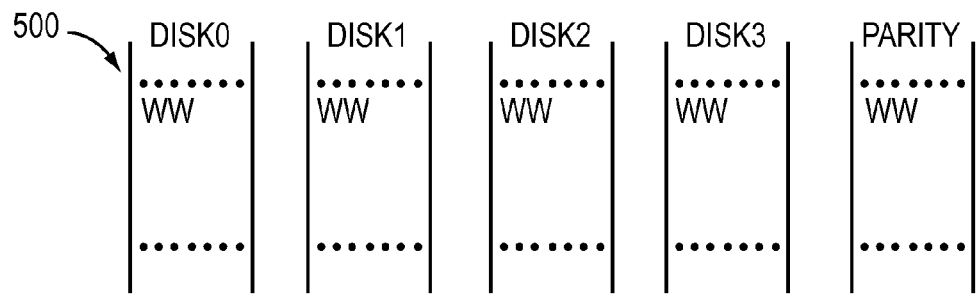
FIG. 5B is a block diagram of one sequential-access band of SMR drives in a RAID5 array, where the user is restricted to writing N units of data at a time, where N is the number of data units in a RAID stripe.

One solution is to enforce a constraint on writing data whereby the user may only write N units of data at a time, where N is the number of data units in a RAID stripe. FIG. 5A is illustrative. There are 4 data units in the raid stripe in FIG. 5A, thus, the user is required to write four units of data at a time. Again because data has been written, RAID will update the parity drive 510e, to hold parity data consistent with the data written in the stripe across the drives 510a-510d. Under this constrained approach, one parity unit is always written along with each row of data units as shown in FIG. 5B. This method avoids the problem illustrated in FIG. 4D where data has been appended and the parity band cannot be updated to be consistent with the appended data.

The method of FIGS. 5A and 5B has two drawbacks. The first being, if the data unit is a typical RAID stripe unit size, such as 64k, then we must enforce a minimum write size of N*64k upon the user. In the example illustrated in FIGS. 5A and 5B the minimum the user would be permitted to write would be 256 k. In a more realistic RAID configuration, this minimum would be anywhere from 384 k to 768 k. This is an onerous restriction, though not insurmountable. However, if we reduce the data unit size to mitigate the first problem, another problem occurs. Suppose the data unit size is a single sector. The minimum write size in this example would be just 2 k, which is not too onerous at all. However, that means every 2 k write must access every drive, every time. It is highly desirable for a small write to access just two drives: the target drive and the parity drive. Distributing such small inputs and outputs across the entire array needlessly involves drives that could be busy servicing other requests. Such a solution makes for an inefficient data storage model.

Figure 6:
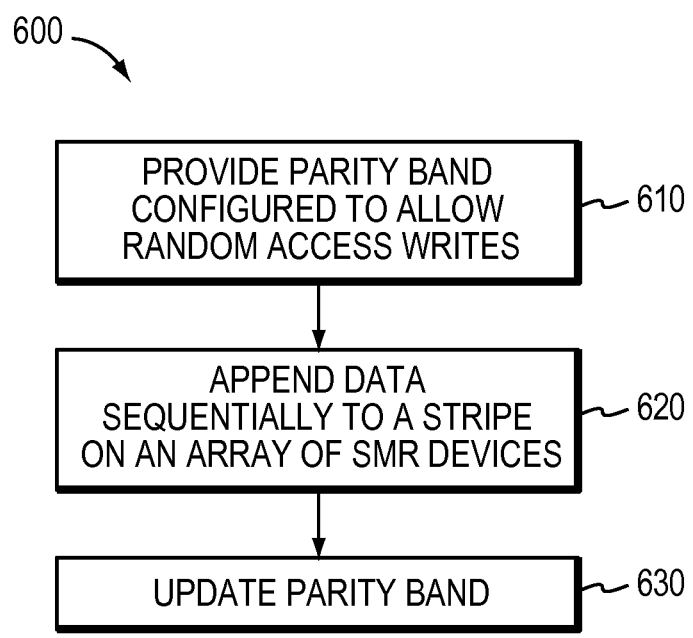
FIG. 6 is a flow chart of a method of the present invention used for writing data to an array of SMR devices.

An embodiment of the present invention avoids these issues and takes advantage of the anticipated ability to format SMR devices with a desired band configuration. Such devices rather than being simply sequential access, would have particular band(s) that allow for random access writes. FIG. 6 is a flow chart of a method 600 of writing data to an array of SMR devices with configurable bands, such as storage drive 150. The method 600 begins by providing a parity band configured to allow for random access writes, 610. The provided band 610 could be on platter 200 which in turn could be in drive 150. After providing a parity band 610, data is appended sequentially to a stripe on an array of SMR devices, 620. Finally, the provided parity band 610 is updated to hold parity data consistent with the data appended to the stripe 630. The method 600 may write data to drives in numerous different configurations, including RAID configurations.

The method 600 may be implemented in computer 110, in storage controller 130, or within drive electronics 160 contained in the disk drives 150. When implemented in computer 110, the implementation would typically be part of the operating system or device drivers installed in that computer.

In addition, the method 600 might be implemented in part in one component and in part in another. For example, one part of the process might be implemented in disk drives 150, while another part is implemented in storage controller 130.

The method 600 may write data to an array of SMR drives 300. The method 600 may append data sequentially to the append units 330 of the array 300. When writing data within an append unit 330 data may be written sequentially to a set of stripe units 350, and/or a set of sectors 360. The method 600 may write data sequentially to the append units, stripes, stripe units, and sectors of the array.

The method 600 takes advantage of the anticipated ability to format a SMR drive with varying band configurations, for example formatting the parity region to be a random-access band. These advantages are illustrated in FIGS. 7A-7D.

Figure 7A:
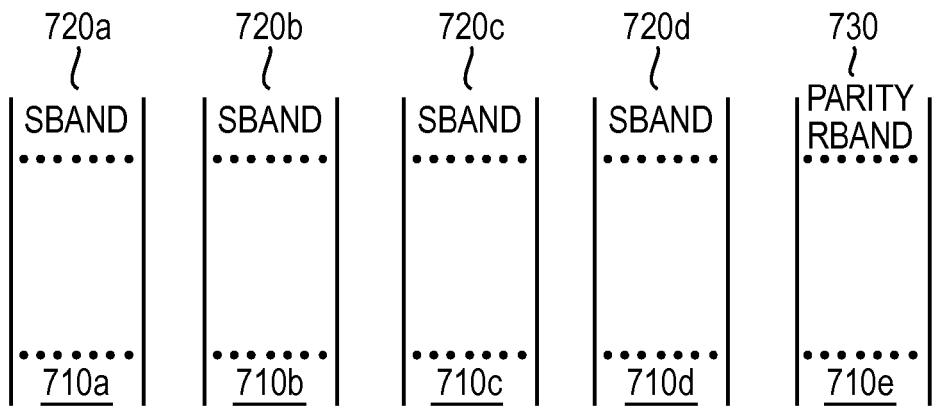
FIG. 7A is a block diagram of one sequential-access band of SMR drives in a RAID5 array with a parity region formatted to be a random-access band.
Figure 7B:
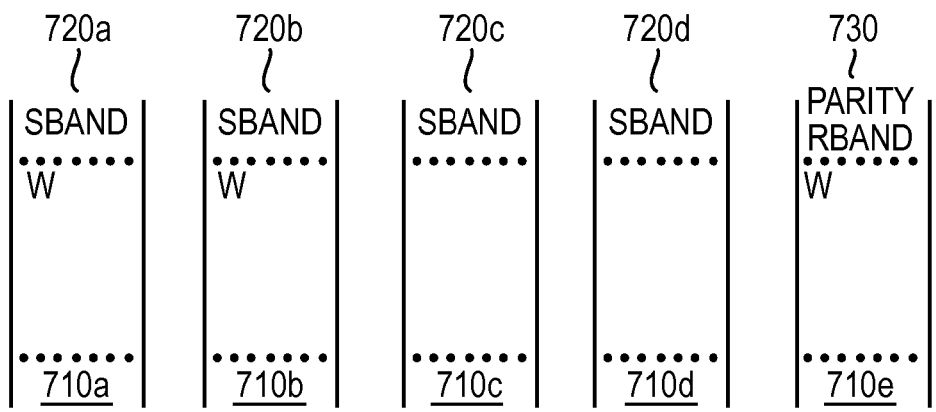
FIG. 7B is a block diagram of one sequential-access band of SMR drives in a RAID5 array with a parity region formatted to be a random-access band and where units of data and the corresponding parity data have been written.
Figure 7C:
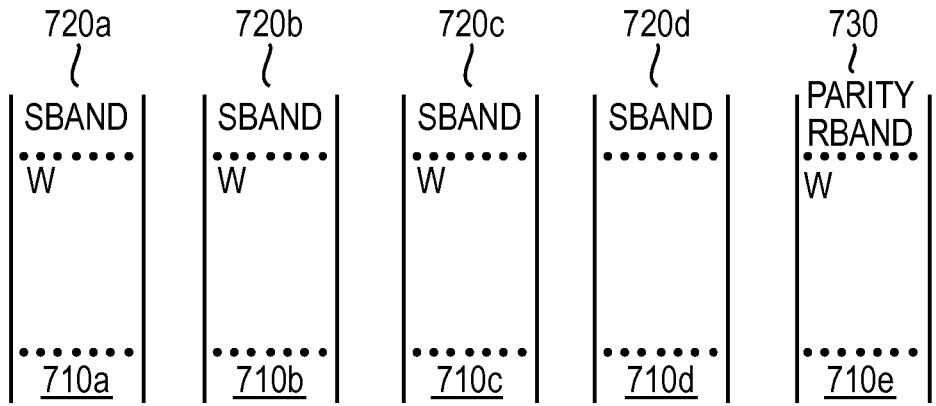
FIG. 7C is a block diagram of one sequential-access band of SMR drives in a RAID5 array as in FIG. 7B where the user has appended an additional unit of data and the corresponding parity data has been updated to reflect this appended data.

FIGS. 7A-7C depicts one sequential access band 720*a*-720*d* of drives 710*a*-710*d*. Drive 710*e* is shown with random access parity band 730.

Under this system, each sequential band 720*a*-720*d* is still append-only, and the array of bands is still append-only, but we can append any amount of data we like, from a sector all the way up to a stripe. See FIG. 7B. In FIG. 7B data is written to drives 710*a* and 710*b*, and corresponding parity data is written to drive 710*e*. Because the parity band 730 is random access, as the user continues to append to the stripe, the parity can be modified as needed, as shown in FIG. 7C. Unlike the previously described method depicted in FIG. 4D, the parity band 730 in drive 710*e* can be updated to be consistent with the data appended to drive 710*c*. This solution avoids the problem illustrated in FIG. 4D, where data is appended to the stripe but the corresponding parity data cannot be updated. This solution does not place onerous write size minimums upon the user as illustrated in FIGS. 5A and 5B.

Figure 7D:
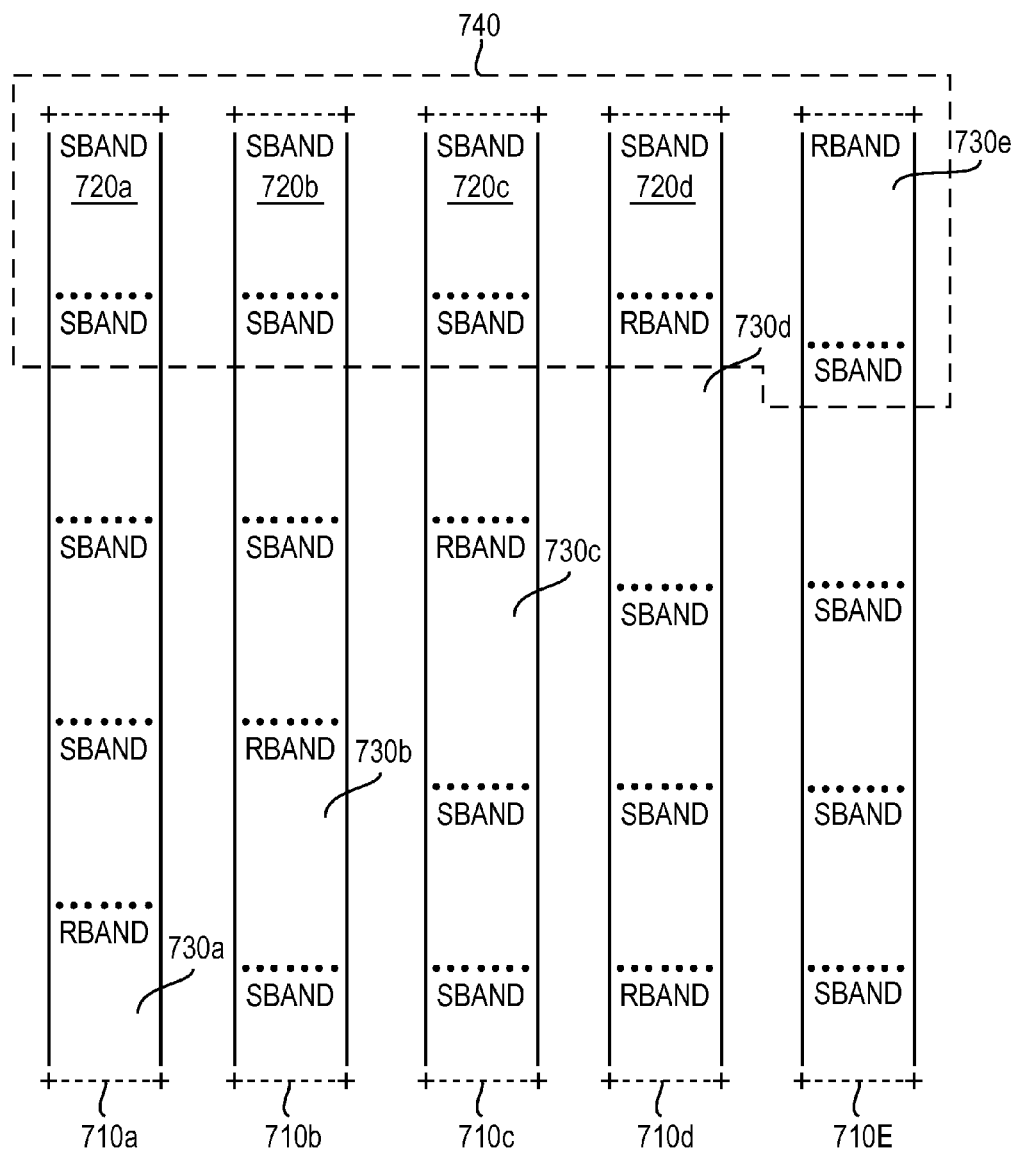
FIG. 7D is a block diagram of SMR drives in a RAID5 configuration depicting the difference in density between the random-access bands and the sequential access bands of the SMR drives.

The method 600 and its different embodiments have many advantages over the prior art. However, method 600 as further illustrated in FIGS. 7A-7C is not perfect because random-access bands are much less dense than sequential-access bands. One solution is to use a drive configured to be a "parity drive" that contains only random-access bands. However, this solution is inefficient because the "parity drive's" capacity would be lower than the other drives in the RAID set. However, an embodiment of the present invention may utilize the parity rotation schemes used in RAID5/RAID50/RAID6 (either ordinary or declustered) among others, on the band level. When using these rotation schemes the relative density of bands evens out, i.e., each drive has approximately the same parity density. FIG. 7D is illustrative. Here each drive 710*a*-710*e* has a parity band 730*a*-730*e*. Each append unit, such as the append unit 740, has a random access band 730*a*-730*e* and sequential access bands. For example, append unit 740 is made up of sequential bands 720*a*-720*d* and random access band 730*e*. As shown, the locations of the random access parity bands 730*a*-730*e* are rotated across the drives 710*a*-710*e*. This ensures that every SMR drive 710*a*-710*e* in the array has the same capacity. The parity band layout as illustrated in FIG. 7D may be referred to as a "left symmetric" parity layout on the band level. While a parity layout that may be implemented in an embodiment of the present invention is illustrated in FIG. 7D, e.g., a left symmetric parity layout, further embodiments of the present invention may utilize any parity layout wherein drives have approximately equal parity density.

Further, in an embodiment of the invention the random-access band is made larger than is needed for parity—for instance, so that such an embodiment of the invention may also be used to store CRCs or remapping indexes.

However, now that the parity band i.e., random access band, is rotated across the different drives, an embodiment may end up with an array of SMR devices wherein each drive has a different band arrangement, as illustrated in FIG. 7D. This means, that should a drive need to be replaced the replacement drive must be reformatted before it can be brought into service, because its band arrangement would need to change depending on which drive it is replacing. The time it will take to replace a drive may increase and data availability may suffer if formatting bands is a lengthy operation.

Figures 8A, 8B, 8C:
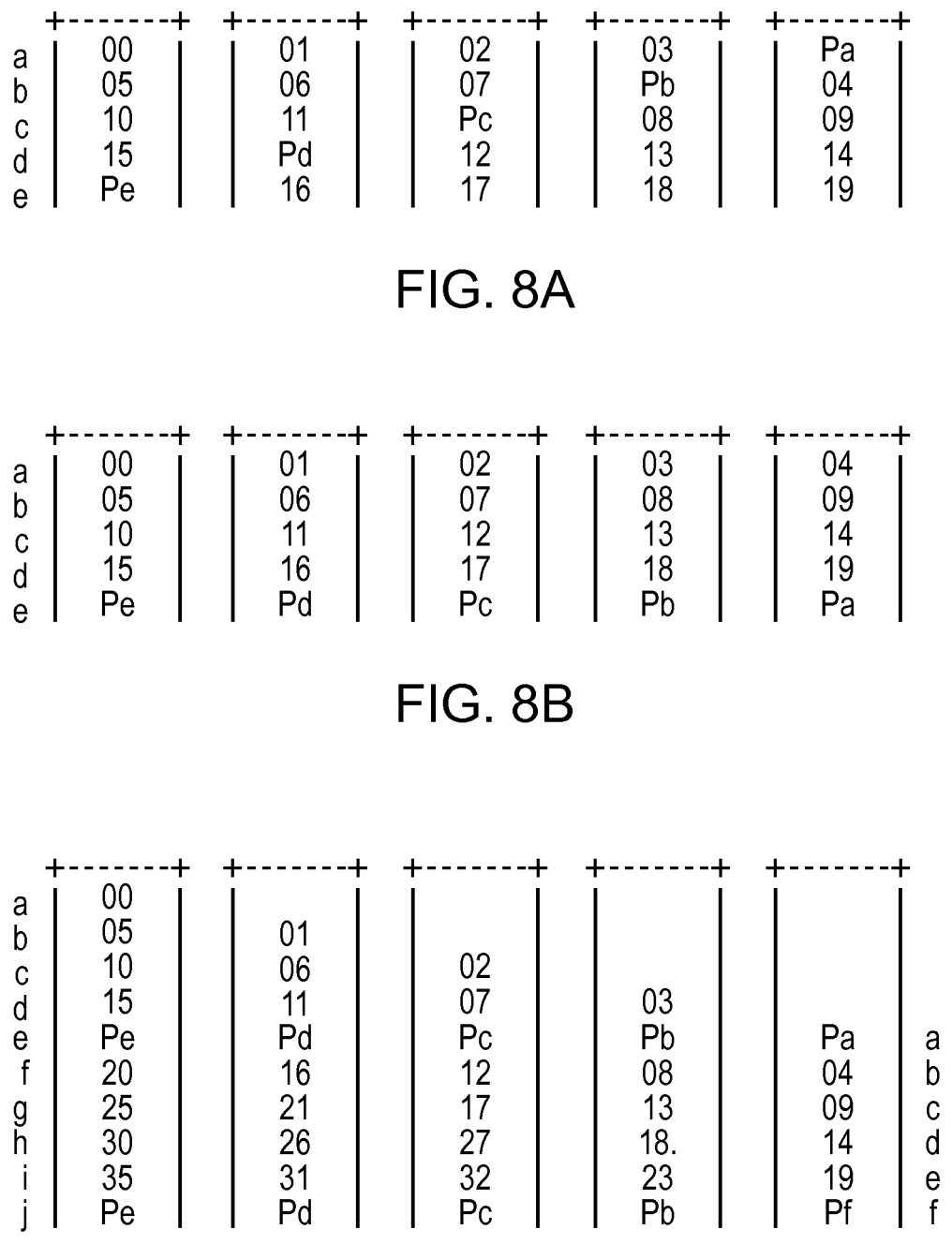

However, RAID is a remapping engine. Rather than physically rotating the parity bands, as usual; as shown in FIG. 8A, where the parity bands Pa-Pe are rotated across the drives. In an embodiment of the invention the parity bands are instead logically rotated as illustrated in FIG. 8B, where the parity bands Pa-Pe, are all located in row "e." Now in an embodiment of the present invention all the drives can be formatted with the same band configurations. Should a drive need to be replaced, its formatting will not have to be customized.

However, this results in a performance penalty for sequential writes. Suppose we wish to write the append unit (00, 01, 02, 03, Pa) followed by append unit (04, 05, 06, 07, Pb). Since parity Pa and parity Pb are out of order, a sequential write load will be polluted with short backward seeks. In an embodiment this problem is avoided by sacrificing a fixed quantity of space per array of SMR devices, as shown in FIG. 8C. In FIG. 8C, the append unit comprising 00, 01, 02, 03, and Pa will be written first, followed by the remaining append units. Writing data in this manner, avoids the inefficient backward seeks that would be necessary if data were written as in FIG. 8B. FIG. 8C illustrates a left symmetric parity band layout that is accomplished by padding the storage devices. In an embodiment of the invention other parity band layouts may be used wherein the storage devices are padded to cause the parity bands to be in the same row. Ensuring the parity bands are in the same row allows each drive in the array to have the same formatting. This is advantageous in practice because drives can be swapped and replaced in the event of a device failure without the need for custom formatting prior to implementation.

Note that when writing data according to FIG. 8C, the same amount of space is wasted at the end as well. Thus, the total number of wasted bands is (n−1) per drive, where n is the width of the RAID set. Given that n is on the order of a dozen, but bands may number in the thousands, this is not much overhead. Finally, observe that this scheme cannot be done with RAID4 arrangements, such as WAFL. If the wasted space is a significant concern, the RAID implementation could remap those unused blocks and still gain use of them (albeit at a lowered level of performance). Observe that the wasted space has the same pattern at the beginning and end of the RAID set layout shown in FIG. 9A.

Figures 9A, 9B:
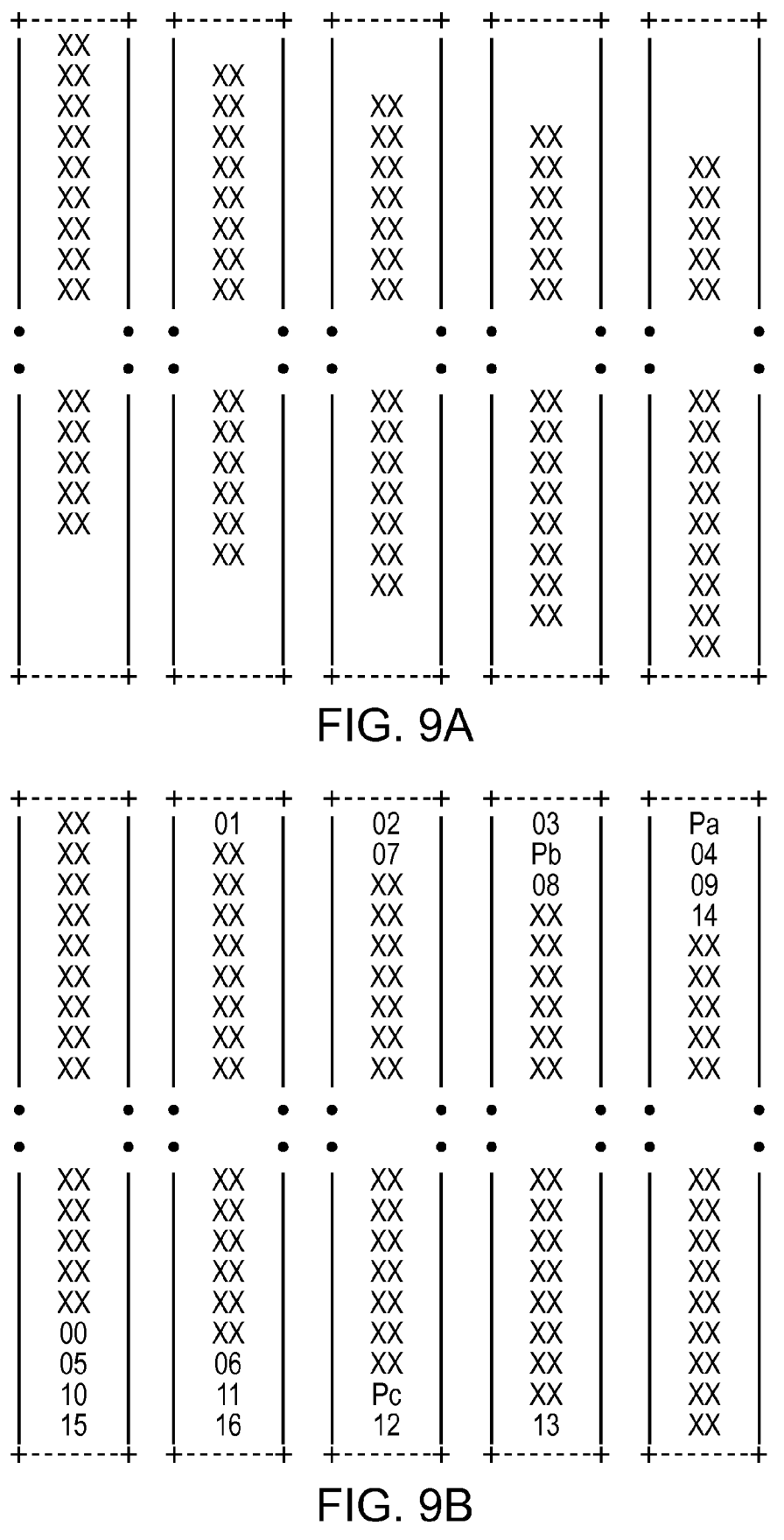

The two pieces of wasted space may be joined to form complete stripes in the RAID layout as shown in FIG. 9B. However, the parity blocks would not reside in random-access bands, but in sequential-access bands, and so would be subject to the limitations mentioned earlier.

Figure 10:
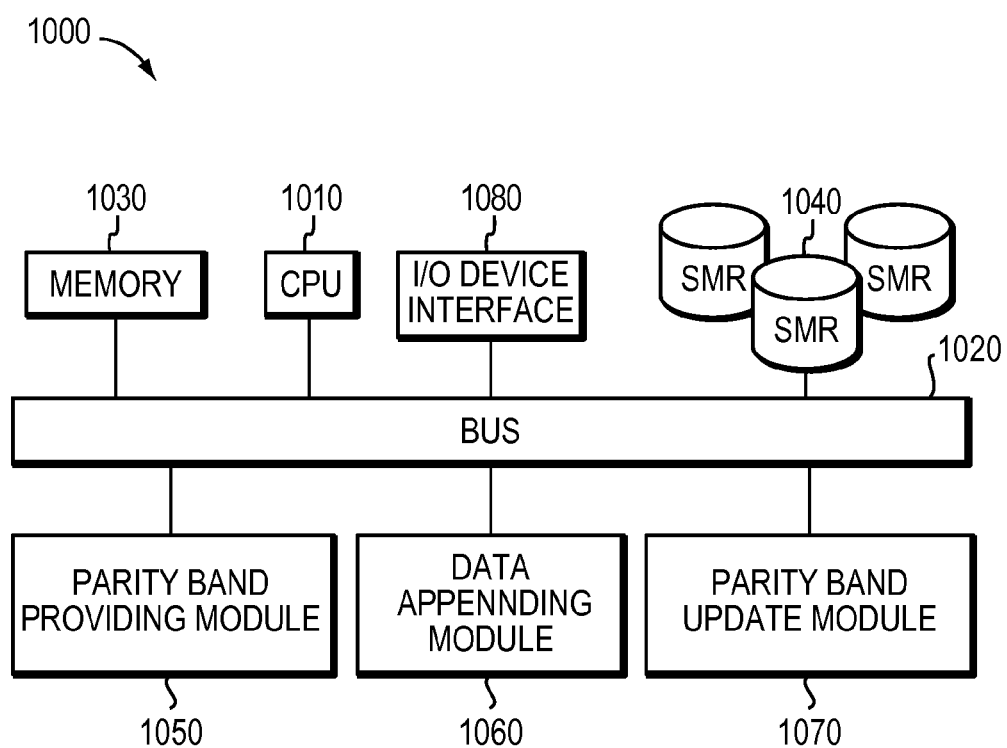
FIG. 10 is a high level block diagram of an Information Handling System (IHS) of the present invention that writes data to an array of SMR devices.

FIG. 10 is a high level block diagram of an information handling system (IHS) 1000 that writes data to an array of SMR devices 1040. The IHS 1000 contains a bus 1020. The bus 1020 is a connection between the various components of the system 1000. Connected to the bus 1020 is an input/output device interface 1080 for connecting various input and output devices, such as a keyboard, mouse, display, speakers, etc., to the system 1000. Central Processing Unit (CPU) 1010 is connected to the bus 1020 and provides for the execution of computer instructions. Memory 1030 provides volatile storage for data used for carrying out computer instructions. Also connected to bus 1020 is an array of SMR storage devices 1040. In another embodiment of the invention the IHS 1000 has local non-volatile storage connected to bus 1020 and the array of SMR devices to which the present invention writes data is remotely connected to the bus 1020. Also connected to the bus 1020 are several modules used to carry out the present invention. Connected is a parity band providing module 1050, a data appending module 1060, and a parity band update module 1070. Modules 1050, 1060, and/or 1070 could also be located within the SMR devices 1040 and/or the CPU 1010. Module 1050 provides the parity bands that contain the parity data that is consistent with data written to the array of SMR devices 1040. Module 1060 appends data to the array of SMR devices 1040. Module 1070 updates the parity band provided by module 1050 to contain data consistent with the appended data.

While the various components of the IHS 1000 are illustrated in FIG. 10, embodiments of the IHS 1000 are not so limited, and as it would be known in the art, components and modules of the IHS 1000 may be connected in a variety of ways, including embodiments wherein one or more components are remotely located. It should be understood by a person of ordinary skill in the art that the IHS 1000 may be implemented in various forms. The respective components and modules of the IHS 1000 may be combined in any manner that is known in the art and may be implemented in any combination of hardware and software. For example, the above-described components and modules may be executable instructions in memory 1030 or an operating system (not shown) operated on by CPU 1010. Further, the IHS 1000 and its various components and modules may be configured to operate in a manner corresponding to any of the methods described herein As previously described, and as depicted in FIG. 4D, if data is written to a traditional array of SMR devices and the user appends data to the stripe the parity band cannot be updated. The parity data was written upon the first instance of writing data to the stripe. Now when data is appended, the parity data cannot be updated to be consistent with the newly appended data because the parity band only allows for sequential writes. In an embodiment of the present invention this problem is solved by using SMR devices formatted to have random access parity bands.

Another embodiment of the present invention solves this problem while still writing data to an array of SMR devices using all sequential access bands. In this embodiment the parity data is written to parity bands configured to allow for limited modification. In such an embodiment a portion of the data in the parity band can be deleted and then data can be appended to the band. For example, data could be deleted from any point in the band to the append location, whereby that point becomes the new append location. According to this embodiment it is not always necessary to delete all of the data in the parity band in order for the band to hold consistent parity data.

Two possible solutions exist for writing data to an array of SMR devices with only traditional sequential access bands. As previously mentioned one way to overcome the "stuck" problem is to constrain the user to writing an entire stripe of data at a time. This solution however, was rejected as being too onerous of a restriction. Another solution would be to delete all of the data in the parity band and rewrite all of the parity data so that it is consistent with the data in the stripe. This solution too is inefficient. As described herein an embodiment of the present invention overcomes these inefficient solutions and writes data to an array of SMR devices having parity bands that allow a portion of the data within the band to be deleted and re-written so that the parity data is consistent with newly appended data. By using such a parity band, data can be written to an array of SMR devices without forcing the user to write an entire stripe of data at a time and without having to delete all of the data in a parity band when data is appended. When writing data to an array of this kind there is a possibility that all of the parity data in the band will need to be rewritten in order for the band to hold consistent data, however, all of the parity data in the parity band will not need to be rewritten every time as would be required with traditional systems. Furthermore, according to the present invention the user will not be required to write an entire stripe of data.

Figure 11:
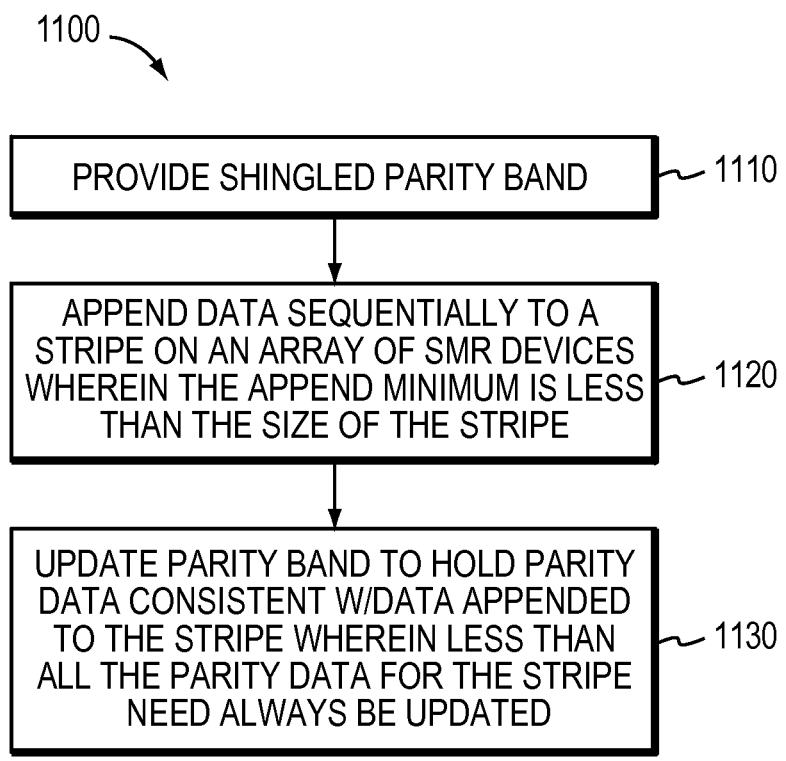
FIG. 11 is a flow chart of a method of writing data to an array of SMR devices, according to the principles of the present invention.

FIG. 11 illustrates a flow chart of a method 1100 of writing data to an array of SMR devices. This method 1100 uses a sequential access parity band configured to allow a portion of the data in the parity band to be deleted and then have data appended to the remaining portion. First, a shingled parity band is provided that is formatted to allow for limited deletion 1110. Next, data is appended sequentially to a stripe on the array of SMR devices 1120. Under method 1100, the user is not required to write an entire stripe of data. Finally, the parity band is updated to hold parity data consistent with the data appended to the stripe 1130. Again it is a feature of method 1100 that when updating the parity band 1130, it is not always necessary for all of the parity data in the entire parity band to be deleted and updated.

Figure 12:
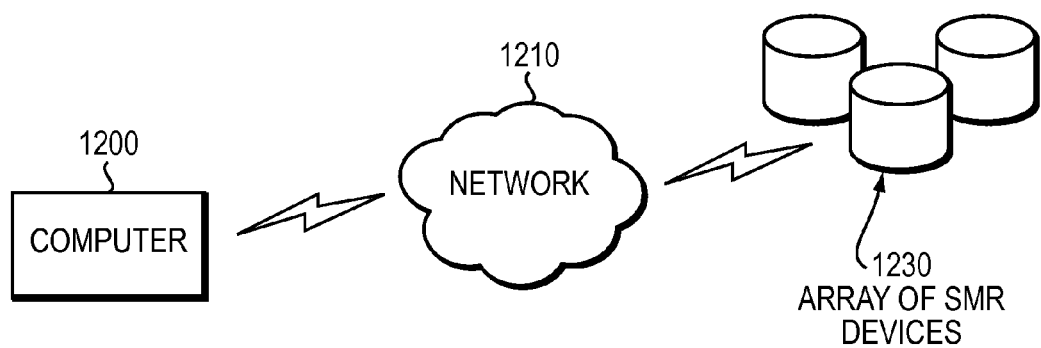
FIG. 12 depicts a computer network in which the present invention may be implemented.

FIG. 12 illustrates a computer network environment in which the present invention may be implemented. Computer 1200 may be linked through communications network 1210 to an array of SMR devices 1230. Computer 1200 may embody IHS 1000 or computer system 100.

It should be understood that the example embodiments described above may be implemented in many different ways. In some instances, the various methods and machines described herein may be implemented by a physical, virtual or hybrid general-purpose computer, or a computer network environment such as the computer network environment illustrated in FIG. 12. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of writing data to an array of shingled magnetic recording (SMR) devices comprising:
   providing a parity band configured to allow random access writes;
   appending data sequentially to a stripe on an array of SMR devices; and
   updating the parity band to hold parity data consistent with the data appended to the stripe.

2. The method of Claim 1, wherein data is appended sequentially within an append unit, and wherein the append unit is a set of bands in the array of SMR devices.

3. The method of Claim 1, wherein the stripe on the array of SMR devices comprises a set of stripe units, and wherein each stripe unit is on a separate SMR device in the array of SMR devices.

4. The method of claim 3, wherein each stripe unit comprises a set of sectors.

5. The method of claim 4, wherein data is appended to each set of sectors sequentially.

6. The method of claim 3, wherein data is appended to the set of stripe units sequentially.

7. The method of Claim 1, comprising:
   appending data to the stripe on the array of SMR devices in a unit as small as allowed by one SMR device in the array of SMR.

8. The method of Claim 1, wherein each SMR device in the array of SMR devices is formatted with a same band configuration.

9. The method of claim 2, wherein the append unit comprises respective uncorresponding bands.

10. The method of Claim h wherein updating the parity band comprises deleting existing parity data from a point in the band to an append location.

11. The method of claim 1, wherein the array of SMR devices is in a RAID configuration.

12. A non-transitory Information Handling System (IHS) for writing data to an array of shingled magnetic recording (SMR) devices comprising:
   a processor; and
   a memory with non-transitory computer code instructions stored therein, the memory operatively coupled to said processor such that the computer code instructions configure the processor to implement:
   a parity band providing module configured to provide a parity band configured to allow random access writes;
   a data appending module configured to append data sequentially to a stripe on an array of SMR devices; and
   a parity band update module configured to update the parity band to hold parity data consistent with the data appended to the stripe.

13. The IHS of claim 12, wherein the data appending module is configured to appended data sequentially within an append unit, wherein the append unit is a set of bands in the array of SMR devices.

14. The IHS of claim 12, wherein the stripe on the array of SMR devices comprises a set of stripe units, and wherein each stripe unit is on a separate SMR device.

15. The IHS of claim 14, wherein each stripe unit comprises a set of sectors.

16. The IHS of claim 15, wherein the data appending module is configured to append data to each set of sectors sequentially.

17. The IHS of claim 14, wherein the data appending module is configured to append data to the set of stripe units sequentially.

18. The IHS of claim 12, wherein the data appending module is configured to append data to the stripe on the array of SMR devices in a unit as small as allowed by one SMR device in the array of SMR devices.

19. The IHS of claim 12, wherein each SMR device in the array of SMR devices is formatted with a same band configuration.

20. The IHS of claim 12, wherein updating the parity band comprises deleting existing parity data from a point in the band to an append location.

21. The IHS of claim 12, wherein the array of SMR devices is in a RAID configuration.

* * * * *